US012736764B2

(12) United States Patent
Luo et al.

(10) Patent No.: US 12,736,764 B2
(45) Date of Patent: Sep. 15, 2026

(54) OPTICAL MODULE

(71) Applicants: INNOLIGHT TECHNOLOGY (SUZHOU) LTD., Jiangsu (CN); INNOLIGHT TECHNOLOGY (TONGLING) LTD., Anhui (CN)

(72) Inventors: Liang Luo, Jiangsu (CN); Fanghong Liu, Jiangsu (CN); Yuzhou Sun, Jiangsu (CN)

(73) Assignees: INNOLIGHT TECHNOLOGY (SUZHOU) LTD., Jiangsu (CN); INNOLIGHT TECHNOLOGY (TONGLING) LTD., Anhui (CN)

( * ) Notice: Subject to any disclaimer, the term of this patent is extended or adjusted under 35 U.S.C. 154(b) by 274 days.

(21) Appl. No.: 18/558,529

(22) PCT Filed: Dec. 6, 2021

(86) PCT No.: PCT/CN2021/135608
§ 371 (c)(1),
(2) Date: Nov. 1, 2023

(87) PCT Pub. No.: WO2022/237140
PCT Pub. Date: Nov. 17, 2022

(65) Prior Publication Data

US 2024/0219663 A1 Jul. 4, 2024

(30) Foreign Application Priority Data

May 8, 2021 (CN) ........................ 202120975966.2

(51) Int. Cl.
*H04B 10/00* (2013.01)
*G02B 6/42* (2006.01)

(52) U.S. Cl.
CPC ........... *G02B 6/428* (2013.01); *G02B 6/4206* (2013.01); *G02B 6/4269* (2013.01); *G02B 6/4284* (2013.01)

(58) Field of Classification Search
CPC .... G02B 6/428; G02B 6/4206; G02B 6/4269; G02B 6/4284; G02B 6/4281; G02B 6/42
See application file for complete search history.

(56) References Cited

U.S. PATENT DOCUMENTS 6,445,475 B1 * 9/2002 Okubora ................ G02B 6/428 398/141
6,769,818 B2 * 8/2004 Wu ...................... G02B 6/4246 385/88

(Continued)

FOREIGN PATENT DOCUMENTS

CN 104459907 3/2015
CN 108761668 11/2018

(Continued)

OTHER PUBLICATIONS

"International Search Report (Form PCT/ISA/210) of PCT/CN2021/135608", mailed on Jan. 21, 2022, with English translation thereof, pp. 1-4.

(Continued)

*Primary Examiner* — Agustin Bello
(74) *Attorney, Agent, or Firm* — JCIPRNET

(57) ABSTRACT

An optical module comprises a housing, and an optical assembly and a circuit board which are arranged inside the housing. The optical module further comprises an optical device box arranged inside the housing. The optical assembly is packaged in the optical device box; the circuit board is provided with an extension portion extending to overlap the optical device box; the optical device box is fixed on one surface of the extension portion; the optical device box is provided with an optical interface and an electrical interface;

(Continued)

the optical assembly comprises a photoelectric chip and an optical processing unit, the photoelectric chip being electrically connected to the circuit board outside the optical device box by means of the electrical interface.

13 Claims, 3 Drawing Sheets

(56) References Cited

U.S. PATENT DOCUMENTS

| | | | | |
|---|---|---|---|---|
| 6,952,532 | B2 * | 10/2005 | Dair | G02B 6/4246 398/139 |
| 7,153,043 | B1 * | 12/2006 | Zhang | G02B 6/4283 385/92 |
| 7,309,173 | B2 * | 12/2007 | Epitaux | H05K 1/189 385/88 |
| 7,439,449 | B1 * | 10/2008 | Kumar | H05K 1/147 174/254 |
| 7,563,035 | B2 | 7/2009 | Ice | |
| 8,463,098 | B2 * | 6/2013 | Khadar | G02B 6/4246 385/134 |
| 10,379,301 | B2 * | 8/2019 | Luo | G02B 6/32 |
| 2004/0208601 | A1 * | 10/2004 | Tan | H04B 10/43 398/135 |
| 2005/0105915 | A1 * | 5/2005 | Light | H05K 1/141 398/164 |
| 2005/0117854 | A1 * | 6/2005 | Chiu | G02B 6/3825 385/92 |
| 2005/0168957 | A1 * | 8/2005 | Kawauchi | G02B 6/4292 361/783 |
| 2007/0053639 | A1 * | 3/2007 | Aruga | G02B 6/4281 385/94 |
| 2009/0285580 | A1 * | 11/2009 | Yasuda | G02B 6/4284 398/139 |
| 2009/0290619 | A1 * | 11/2009 | Flens | H05K 1/147 375/219 |
| 2009/0324238 | A1 * | 12/2009 | Kunii | H05K 1/189 398/135 |
| 2010/0215324 | A1 * | 8/2010 | Ban | G02B 6/4281 385/88 |
| 2011/0008056 | A1 * | 1/2011 | Yagisawa | H05K 1/147 174/254 |
| 2012/0008289 | A1 * | 1/2012 | Aruga | G02B 6/4281 361/749 |
| 2012/0087136 | A1 * | 4/2012 | Kuwahara | H05K 1/118 361/679.01 |
| 2012/0224814 | A1 * | 9/2012 | Hirano | G02B 6/4284 385/49 |
| 2013/0094864 | A1 * | 4/2013 | Duis | G02B 6/4246 398/139 |
| 2014/0294351 | A1 * | 10/2014 | Huang | G02B 6/4245 385/89 |
| 2016/0112137 | A1 * | 4/2016 | Pfnuer | H04B 10/503 398/183 |
| 2016/0286657 | A1 * | 9/2016 | Ban | H05K 3/363 |
| 2018/0180828 | A1 * | 6/2018 | Zhao | H05K 1/181 |
| 2018/0287705 | A1 * | 10/2018 | Lin | G02B 6/12004 |
| 2019/0052049 | A1 * | 2/2019 | Sato | H01S 5/4012 |
| 2019/0182949 | A1 * | 6/2019 | Misawa | H05K 1/118 |
| 2020/0116961 | A1 * | 4/2020 | Ding | G02B 6/4256 |
| 2021/0059050 | A1 * | 2/2021 | Noguchi | H05K 1/118 |
| 2021/0247576 | A1 * | 8/2021 | Oomori | H04B 10/67 |
| 2022/0236506 | A1 * | 7/2022 | Mizuno | H04B 10/40 |
| 2022/0337022 | A1 * | 10/2022 | Zhang | G02B 6/4281 |
| 2022/0404563 | A1 * | 12/2022 | Liu | H01S 5/0233 |
| 2022/0416901 | A1 * | 12/2022 | Yoshimura | H01S 5/4012 |
| 2024/0219663 | A1 * | 7/2024 | Luo | G02B 6/4269 |

FOREIGN PATENT DOCUMENTS

| | | |
|---|---|---|
| CN | 112198598 | 1/2021 |
| CN | 112444923 | 3/2021 |
| CN | 212647082 | 3/2021 |
| CN | 213122371 | 5/2021 |

OTHER PUBLICATIONS

"Written Opinion of the International Searching Authority (Form PCT/ISA/237) of PCT/CN2021/135608", mailed on Jan. 21, 2022, pp. 1-5.

* cited by examiner

OPTICAL MODULE

CROSS-REFERENCE TO RELATED APPLICATION

This application is a 371 of international application of PCT application serial no. PCT/CN2021/135608, filed on Dec. 6, 2021, which claims the priority benefit of China application no. 202120975966.2, filed on May 8, 2021. The entirety of each of the above mentioned patent applications is hereby incorporated by reference herein and made a part of this specification.

BACKGROUND

Technical Field

The present disclosure relates to the field of optical communications, and in particular, to an optical module.

Description of Related Art

The fast development of big data, Internet of Things, and 5G services has pushed the requirement for network capacity forward to a higher level. As an important component for photoelectric conversion in optical communication networks, related industries have imposed a higher standard on the speed of optical module, and the development of its packaging also tends to be miniaturized.

In applications of long-distance transmission, the application environment of optical modules is usually in harsh conditions and there are great changes in ambient temperature. Generally, the optical assemblies are packaged in a hermetically sealed box inside the optical module to reduce the impact of the external environment on the optical assemblies. Commonly adopted optical modules include a housing, a circuit board, an optical device box, and optical assemblies contained in the optical device box, wherein the circuit board and the optical device box are both arranged in the space formed by the housing. Specifically, when it comes to the arrangement inside the housing, the optical device box is normally located outside an end of the circuit board and is electrically connected to the end of the circuit board. In this way, in the limited internal space of the housing, since the optical device box occupies a large area and the size of the circuit board is limited, the layout space on the circuit board is significantly restricted, which makes it difficult to minimize the optical module. In the prior art, solutions such as mother-son double-layer boards are normally adopted to alleviate this problem to a certain extent. However, these solutions pose certain challenges to the module assembly, high-frequency crosstalk and reliability of optical modules.

In view of the above, it is necessary to provide an improved technical solution to solve the above problems.

SUMMARY

This disclosure aims to at least solve the technical problems existing in the related art. In order to achieve the above purpose, the disclosure provides an optical module whose specific design method is as follows.

An optical module includes a housing, and an optical assembly and a circuit board which are arranged inside the housing. The optical module further includes an optical device box arranged inside the housing. The optical assembly is packaged in the optical device box. The circuit board is provided with an extension portion extending to overlap the optical device box. The optical device box is fixed on one surface of the extension portion. The optical device box is provided with an optical interface and an electrical interface. The optical assembly includes a photoelectric chip and an optical processing unit. The photoelectric chip is electrically connected to the circuit board outside the optical device box through the electrical interface. The optical processing unit is optically connected to the outside of the optical device box through the optical interface.

In an embodiment, the housing includes an upper housing, a lower housing and a movable head that cooperate with each other. The upper housing and the lower housing are matched to form an internal accommodation cavity and an end portion space for accommodating the movable head. One end of the internal accommodation cavity is connected to the end portion space, and the other end has an opening. The circuit board and the optical device box are located in the internal accommodation cavity. The extension portion of the circuit board is adjacent to the end portion space, and one end of the circuit board away from the extension portion passes through the opening to be electrically connected to the outside of the optical module.

In an embodiment, the extension portion has a fixed surface adjacent to the optical device box and an expanded surface away from the fixed surface. The fixed surface is configured to support and fix the optical device box. The layout space of the circuit board includes the expanded surface.

In an embodiment, the electrical interface includes a radio frequency (RF) signal connection port and a direct current (DC) signal connection port, the RF signal connection port is electrically connected to the circuit board, and configured to transmit a RF signal between the circuit board and the optical assembly inside the optical device box. The DC signal connection port is electrically connected to the circuit board, and configured to transmit a DC signal between the circuit board and the optical assembly inside the optical device box.

In an embodiment, the optical module includes a conductive substrate. The conductive substrate is provided on one side wall of the optical device box. One end of the conductive substrate is electrically connected to the optical assembly in the optical device box, and the other end extends through the side wall to the outside of the optical device box. A portion of the conductive substrate located outside the optical device box has two surfaces opposite each other, and the RF signal connection port and the DC signal connection port are respectively located on the two surfaces.

In an embodiment, the RF signal connection port is electrically connected to the circuit board through a RF signal flexible circuit board. The DC signal connection port is electrically connected to the circuit board through a DC signal flexible circuit board.

In an embodiment, the optical assembly includes a transmission end optical assembly and a receiving end optical assembly. The RF signal flexible circuit board includes a first transmission portion and a second transmission portion. The first transmission portion is provided for the circuit board to transmit a RF signal toward the transmission end optical assembly, and the second transmission portion is provided for the receiving end optical assembly to transmit a RF signal toward the circuit board.

In an embodiment, the first transmission portion and the second transmission portion are arranged in parallel. The RF signal flexible circuit board also has a ground trace provided between the first transmission portion and the second transmission portion, and the ground trace is provided to isolate the first transmission portion from the second transmission portion.

In an embodiment, the RF signal flexible circuit board and the DC signal flexible circuit board are respectively and electrically connected to the RF signal connection port and the DC signal connection port on both surfaces of the conductive substrate through an anisotropic conductive film or a solder anisotropic conductive paste.

In an embodiment, the optical device box includes a bottom plate, side walls arranged around the bottom plate, and a cover plate opposite to the bottom plate. The side walls connect the bottom plate and the cover plate. The cover plate is adjacent to the extension portion of the circuit board, and the bottom plate is adjacent to the inner wall of the housing.

In an embodiment, the optical device box is a hermetically sealed box.

In an embodiment, the bottom plate is a heat-dissipation plate, the photoelectric chip is thermally connected to the heat-dissipation plate, and the heat-dissipation plate is thermally connected to the housing.

In an embodiment, the photoelectric chip includes a light-emitting chip and a light-receiving chip. The optical processing unit includes a transmission end optical processing unit and a receiving end optical processing unit. The optical assembly includes a transmission end optical assembly and a receiving end optical assembly. The transmission end optical assembly includes the light-emitting chip and the transmission end optical processing unit, and the receiving end optical assembly includes the light-receiving chip and the receiving end optical processing unit. The optical device box is provided with a partition isolating the transmission end optical assembly from the receiving end optical assembly.

Compared with the related art, in the technical solution of the optical module involved in this disclosure, the optical device box is located on one side of the circuit board, and the circuit board has an extension portion that extends to overlap with the optical device box, so that the circuit board is able to extend from one end of the housing away from the movable head thereof to be closer to the movable head, thereby increasing the size of the circuit board. One side surface of the extension portion facing away from the optical device box provides an additional layout space for the circuit board, so that the circuit board inside the housing has a larger layout space as compared with the related art. In this way, it is possible to make it easier to minimize the optical module.

BRIEF DESCRIPTION OF THE DRAWINGS

In order to explain the embodiments of the present disclosure or the technical solutions in the related art more clearly, the drawings needed to be used in the description of the embodiments or the related art will be briefly introduced below. Obviously, the drawings in the following description are only an embodiment of the present disclosure. For those of ordinary skill in the art, other drawings may be obtained based on the provided drawings without exerting creative efforts.

In the figure, 100 is a circuit board, 10 is an extension portion, 101 is a fixed surface, 102 is an expanded surface, 11 is a first connection position, 12 is a second connection position, 200 is a housing, 21 is an upper housing, 22 is a lower housing, 300 is an optical device box, 30 is a partition, 31 is a first accommodation cavity, 32 is a second accommodation cavity, 33 is a conductive substrate, 331 is a first signal connection port, 332 is a second signal connection port, 34 is heat-dissipation plate, 340 is a gap, 35 is a cover plate, 41 is a first flexible circuit board, 42 is a second flexible circuit board, 51 is a transmission interface, 52 is a receiving interface, and 600 is a movable head.

DESCRIPTION OF THE EMBODIMENTS

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in this disclosure, all other embodiments obtained by those of ordinary skill in the art without creative efforts should fall within the scope of protection of this disclosure.

Figure 4:
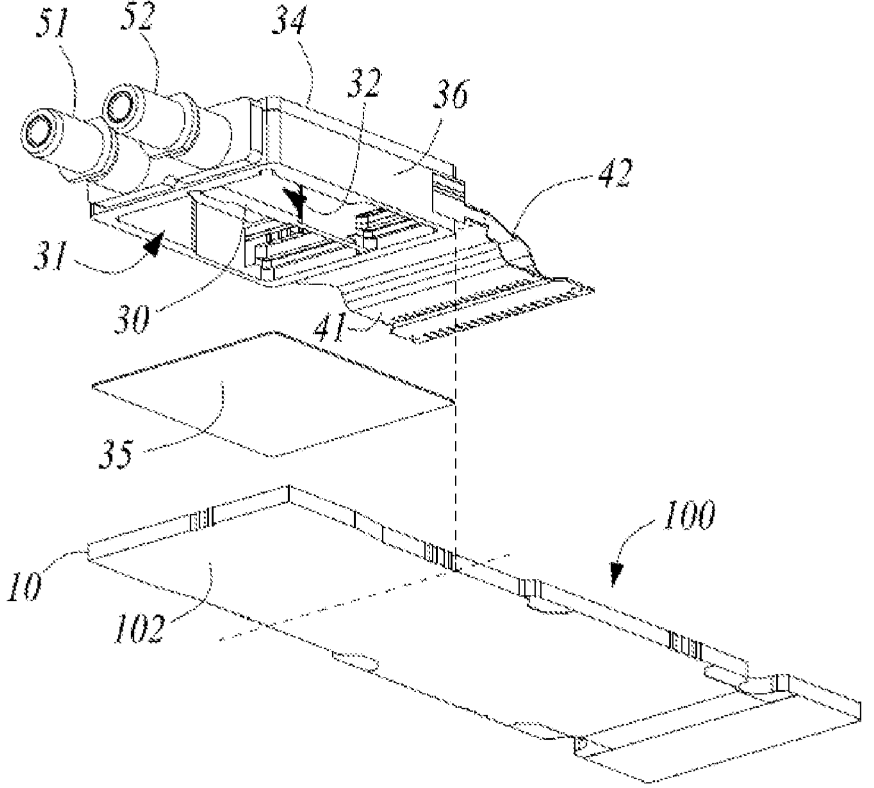
FIG. 4 shows a schematic view illustrating a condition viewed from another angle, which is before a cover plate of the structure in FIG. 2 is assembled on the optical device box.
Figure 5:
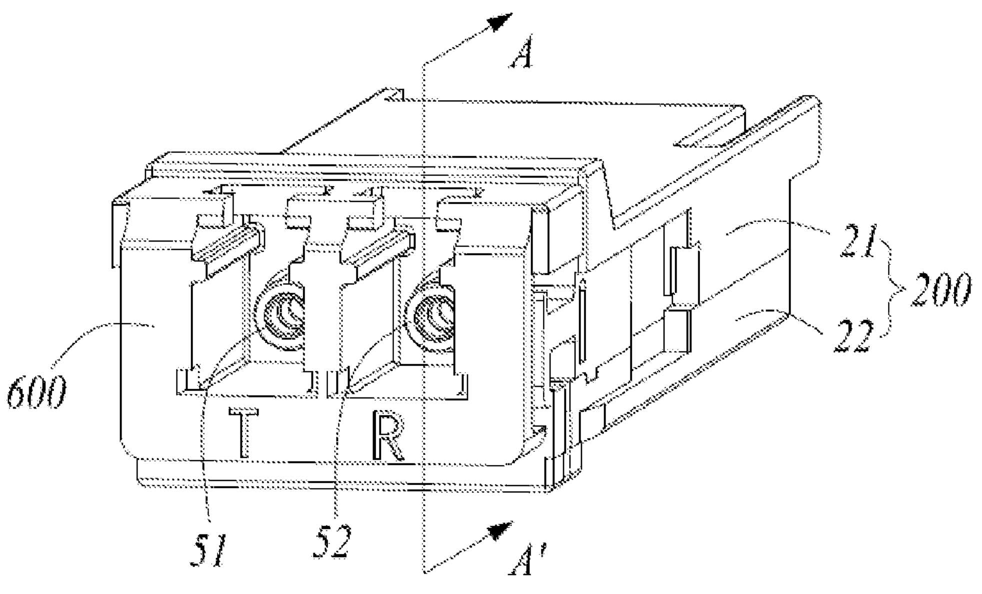
FIG. 5 shows a three-dimensional schematic view of the optical module shown in FIG. 1 after assembly.

In a specific embodiment of the present disclosure, as shown in FIG. 5, an optical module includes a housing 200. Further, as shown in FIG. 1, FIG. 2, FIG. 3, and FIG. 4, the optical module further includes an optical assembly (not shown in the figure) and a circuit board 100 which are disposed in the housing 200. The optical module involved in this disclosure further includes an optical device box 300 provided in the housing 200. The optical assembly is packaged in the optical device box 300. The circuit board 100 has an extension portion 10 that extends to overlap the optical device box 300. The optical device box 300 is fixed on a surface of the extension portion 10.

In this disclosure, the optical device box 300 is provided with an optical interface and an electrical interface, and the optical assembly includes an photoelectric chip and an optical processing unit, wherein the photoelectric chip is electrically connected to the circuit board 100 outside the optical device box 300 through the electrical interface, and the optical processing unit is optically connected to the outside of the optical device box 300 through the optical interface.

Figure 1:
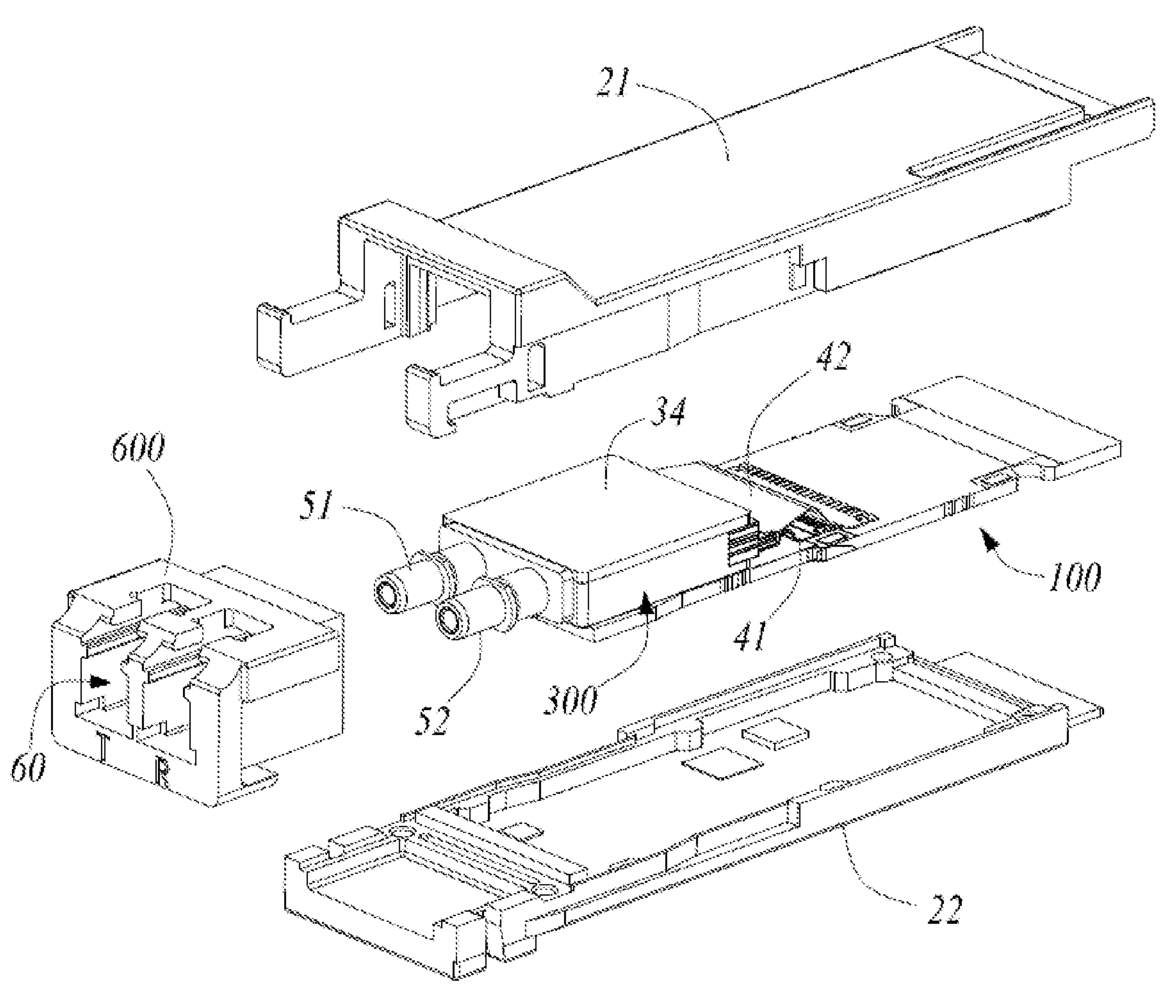
FIG. 1 shows an exploded schematic view illustrating an optical module according to an embodiment of the present disclosure.
Figure 2:
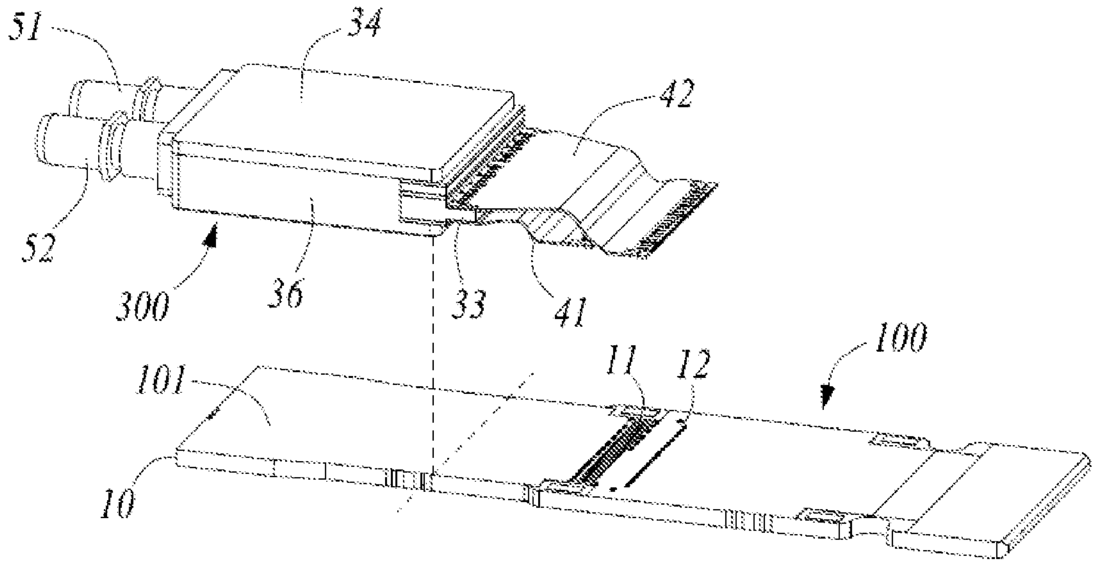
FIG. 2 shows a schematic view illustrating an optical device box, which is connected to a flexible circuit board, in the form of not being connected to the circuit board.
Figure 6:
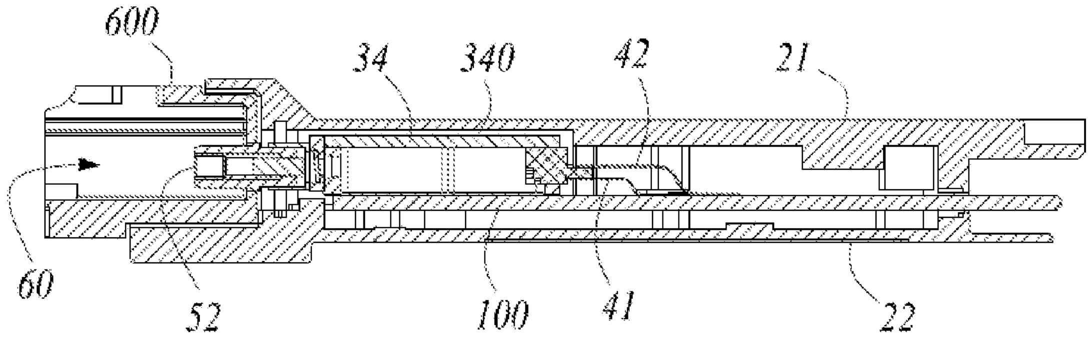
FIG. 6 shows a schematic cross-sectional view of the structure shown in FIG. 5 at position A-A'.

Referring to FIG. 1 and FIG. 6, the housing 200 involved in the disclosure includes an upper housing 21, a lower housing 22 and a movable head 600 that cooperate with each other. The upper housing 21 and the lower housing 22 are matched to form an internal accommodation cavity and an end portion space for accommodating the movable head 600. One end of the internal accommodation cavity is connected to the end portion space, and the other end has an opening. The circuit board 100 and the optical device box 300 are located in the internal accommodation cavity. The extension portion 10 of the circuit board 100 is adjacent to the end portion space, and one end of the circuit board 100 away from the extension portion passes through the opening to be electrically connected to the outside. The end portion of the circuit board 100 passing through the above opening is an electrical connection end, which is normally provided as a gold finger to achieve pluggable electrical connection with an external optical communication host. In other embodiments, the electrical connection end of the circuit board may also be electrically connected to the outside using other electrical connectors.

During the specific implementation of this embodiment, as shown in the figure, the extension portion 10 has a fixed surface 101 adjacent to the optical device box 300 and an expanded surface 102 away from the fixed surface 101; wherein, the fixed surface 101 is provided to carry and fixed optical device box 300; the layout space of the circuit board 100 includes the expanded surface 102. The optical device box 300 may be fixed on the circuit board 100 by bonding with an adhesive such as epoxy resin or welding between the optical device box 300 and the fixed surface 101.

In this embodiment, based on the arrangement of the extension portion 10, the layout space of the circuit board 100 increases the space corresponding to the expended surface 102 as compared with the related art. That is to say, the technical solution involved in this disclosure is to dispose the optical device box 300 on one side of the circuit board 100, so that the circuit board may extend from one end of the housing away from the movable head to a position adjacent to the movable head, thus increasing the size of the circuit board. As compared with related art, the disclosure has a larger layout space, which makes it easier to minimize the optical module without affecting the performance of the optical module.

The electrical interface is provided to realize electrical connection between the optical assembly inside the optical device box 300 and the circuit board 100. In this disclosure, the electrical interface includes a RF signal connection port and a DC signal connection port. The RF signal connection port is electrically connected to the circuit board 100 and transmits a RF signal between the circuit board 100 and the optical assembly inside the optical device box 300. The DC signal connection port is electrically connected to the circuit board 100 and transmits a DC signal between the circuit board 100 and the optical assembly inside the optical device box 300. RF signals and DC signals are transmitted separately.

Figure 3:
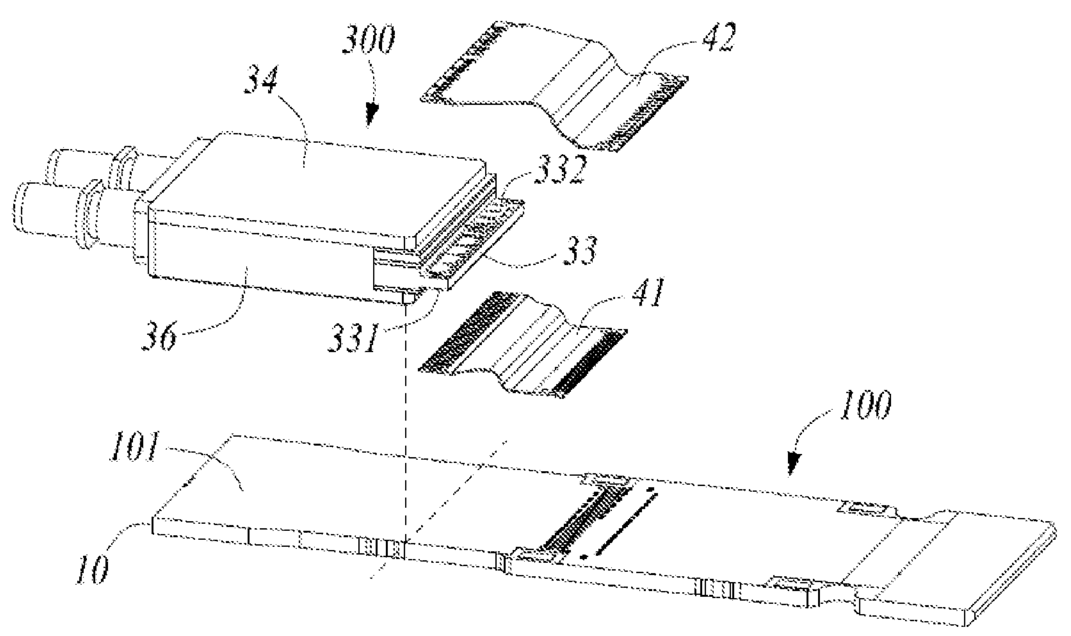
FIG. 3 shows a schematic view illustrating a condition before the flexible circuit board of the structure in FIG. 2 is connected to the optical device box.

In an embodiment of the present disclosure, as shown in FIG. 3 and FIG. 4, the optical module includes a conductive substrate 33. The conductive substrate 33 is disposed on one side wall (at electrical interface) of the optical device box 300. One end of the conductive substrate 33 is electrically connected to the optical assembly in the optical device box 300, and the other end passes through the corresponding side wall and extends to the outside of the optical device box 300. A portion of the conductive substrate 33 located outside the optical device box 300 has two surfaces opposite to each other, and the RF signal connection port and the DC signal connection port are respectively provided on the two surfaces.

Specifically, in this embodiment, the conductive substrate 33 may be a conductive ceramic substrate. The conductive ceramic substrate includes a ceramic body arranged substantially parallel to the circuit board 100 and a conductive metal wire formed on the ceramic body. The conductive metal wire is electrically connected to the optical assembly in the optical device box 300. A portion of the conductive ceramic substrate outside the optical device box 300 has a first signal connection port 331 formed on the lower surface side of the ceramic body and a second signal connection port 332 formed on the upper surface side of the ceramic body. One of the first signal connection port 331 and the second signal connection port 332 is a RF signal connection port, and the other is a DC signal connection port.

Furthermore, the RF signal connection port in this embodiment is electrically connected to the circuit board 100 through a RF signal flexible circuit board; the DC signal connection port is electrically connected to the circuit board 100 through a DC signal flexible circuit board. In other embodiments of the present disclosure, the RF signal connection port may also be electrically connected to the circuit board 100 through bonding wires; the DC signal connection port may also be electrically connected to the circuit board 100 through electrical connectors such as pins or conductive spring sheets.

Specifically, in the embodiment shown in FIG. 1 to FIG. 4, the first signal connection port 331 is electrically connected to the first connection position 11 on the circuit board 100 through the first flexible circuit board 41, and the second signal connection port 332 is electrically connected to the second connection position 12 on the circuit board 100 through the second flexible circuit board 42. In this specific embodiment, the first connection position 11 and the second connection position 12 are both located on a side surface of the circuit board 100 on which the optical device box 300 is disposed. That is, the first flexible circuit board 41 and the second flexible circuit board 42 are both welded on the same side surface of the circuit board 100. The same jig may be used during welding, and there is no need to turn the circuit board 100 over, so that the welding process is more efficient.

In a more specific embodiment, the first signal connection port 331 is a DC signal connection port, and the first flexible circuit board 41 connected to the first signal connection port 331 is a DC signal flexible circuit board; the second signal connection port 332 is a RF signal connection port, and the second flexible circuit board 42 connected to the second signal connection port 332 is a RF signal flexible circuit board.

It should be understood that in another embodiment of the present disclosure, when the first signal connection port 331 is a RF signal connection port, the first flexible circuit board 41 connected to the first signal connection port 331 is a RF signal flexible circuit board. Correspondingly, under the circumstances, the second signal connection port 332 is a DC signal connection port, and the second flexible circuit board 42 connected to the second signal connection port 332 is a DC signal flexible circuit board.

In addition, in the embodiment shown in FIG. 1 to FIG. 4 of the present disclosure, the DC signal flexible circuit board and the DC connection port, as well as the RF flexible circuit board and the RF connection port are respectively connected through an anisotropic conductive film (ACF). The signal connection ports on two different surfaces of the conductive substrate 33 are respectively connected to the corresponding flexible circuit boards by using anisotropic conductive films. The upper and lower surfaces may be welded simultaneously, so that the two flexible circuit boards may be welded to the upper and lower surfaces of the conductive substrate 33 at one time. In this way, it is possible to make the assembly and connection process of the optical module simpler.

However, it should be understood that in other embodiments of the present disclosure, the DC signal flexible circuit board and the DC connection port, as well as the RF flexible circuit board and the RF connection port may be respectively connected through a solder anisotropic conductive paste (SACP). Alternatively, it is possible to use solders with different melting points to solder two flexible circuit boards to the two connection ports separately. In specific implementation, the melting point of the solder between the signal connection port and the corresponding flexible circuit board connected by welding first is higher than the melting point of the solder between the signal connection port and the corresponding flexible circuit board connected by welding later. For example, in a specific embodiment, if the DC signal flexible circuit board and the DC connection port are welded first, and the RF flexible circuit board and the RF connection port are welded later, then the melting point of the solder between the DC signal flexible circuit board and the DC connection port is 280° C. to 320° C., while the melting point of the solder between the RF flexible circuit board and the RF connection port is 240° C. to 280° C.

In a specific implementation of this embodiment, the RF signal flexible circuit board includes a first transmission portion (not shown in the figure) and a second transmission portion (not shown in the figure). The first transmission portion is provided for the circuit board 100 to transmit a RF signal toward the transmission end optical assembly, and the second transmission portion is provided for the receiving end optical assembly to transmit a RF signal toward the circuit board 100. In this disclosure, the transmission portions for transmitting RF signals in two different directions are integrated on the same RF signal flexible circuit board, so as to simplify the assembly process of the optical module.

In another embodiment, the first transmission portion and the second transmission portion are arranged in parallel. The RF signal flexible circuit board further has a ground trace disposed between the first transmission portion and the second transmission portion, and the ground trace is provided to isolate the first transmission portion from the second transmission portion. Based on the isolation effect of the ground trace, it is possible to reduce or suppress high-frequency crosstalk during signal transmission between the first transmission portion and the second transmission portion (i.e., the receiving end and the transmitting end).

Correspondingly, in yet another embodiment of the present disclosure, the DC signal flexible circuit board includes a third transmission portion and a fourth transmission portion. The third transmission portion is provided for the circuit board 100 to transmit a DC control signal toward the transmitting end optical assembly, and the fourth transmission portion is provided for the circuit board 100 to transmit a DC control signal toward the receiving end optical assembly. The third transmission portion and the fourth transmission portion are disposed in parallel. The transmission portions provided for transmitting DC control signals in two different directions are integrated on the same DC signal flexible circuit board, so it is possible to simplify the assembly process of the optical module.

In this disclosure, it only requires two flexible circuit boards (DC signal flexible circuit board and RF signal flexible circuit board) for the optical device box packaged with the transmission end optical assembly and the receiving end optical assembly to be electrically connected to the circuit board 100, thereby reducing the difficulty of the welding process and simplifying the manufacturing process of the optical module.

In a specific embodiment of the present disclosure, as shown in FIG. 1 to FIG. 4, the optical device box 300 includes a bottom plate 34, side walls 36 arranged around the bottom plate 34, and a cover plate 35 opposite to the bottom plate 34. The side walls connect the bottom plate 34 and the cover plate 35; wherein, the cover plate 35 is adjacent to the extension portion 10 of the circuit board 100, and the bottom plate 34 is adjacent to the inner wall of the housing 200. When assembling the optical module, the cover plate 35 may be opened relative to the side wall (see FIG. 4), and then the cover plate 35 is provided to seal the optical device box 300 after the optical assembly is assembled.

An area where the extension portion 10 is overlapped with the optical device box 300 is greater than or equal to half of the area of the cover plate 35. In an embodiment of the present disclosure, the extension portion 10 extends to a side wall of the optical device box 300 where the optical interface is provided and adjacent to the end portion space of the housing that accommodates the movable head. The area where the extension portion 10 overlaps with the optical device box 300 is substantially equal to the area of cover plate 35. Based on this arrangement, it is possible to achieve sufficient bonding force between the extension portion 10 and the optical device box 300 to avoid unstable connection between the optical device box 300 and the circuit board 100, while ensuring that the layout space of the circuit board 100 is increased to a larger extent.

In an embodiment, the optical device box 300 involved in this disclosure is a hermetically sealed box. The optical assembly in the optical device box 300 are normally composed of precision and vulnerable components. Since the optical device box 300 is arranged as a hermetically sealed box, it is possible to better protect the optical assembly therein, thereby enabling the optical module to be put into use in extreme environments with harsh conditions and have a wider range of applications.

In yet another embodiment, the bottom plate 34 is a heat-dissipation plate. The photoelectric chip involved in this disclosure is thermally connected to the heat-dissipation plate; the heat-dissipation plate is thermally connected to the housing 200. In specific implementation, components such as photoelectric chips that easily generate heat during operation of the optical assembly may be fixed on the inner surface of the heat-dissipation plate through a heat conductive part, thus enhancing the heat dissipation efficiency of the optical device box 300. In an optical module, components such as the photoelectric chips of the optical assembly (including the light-emitting chip of the transmission end optical assembly and the light-receiving chip of the receiving end optical assembly) will generate heat when the optical module is operating. In order to prevent the heat generated by the optical assembly from affecting the service life and normal operation of the optical module, the heat must be discharged in time. This problem may be effectively solved by setting the bottom plate 34 as a heat-dissipation plate.

In addition, as shown in FIG. 1 to FIG. 4, in this embodiment, a side of the optical device box 300 where the cover plate 35 is disposed is connected and matched with the circuit board 100. The material of the circuit board 100 makes it difficult to dissipate the heat from the optical device box 300. In this embodiment, the heat-dissipation plate is arranged on one side of the optical device box 300 away from the circuit board 100 instead of on the side close to the circuit board 100. In this way, it is possible to effectively optimize the dissipation of heat from the optical device box 300 and prevent the circuit board 100 from affecting heat dissipation of the optical device box 300.

In the specific application process of the optical module, the heat discharged from the heat-dissipation plate to the exterior of the optical device box 300 needs to pass through the housing 200 to be completely discharged to the exterior of the optical module. In order to improve the heat transmission efficiency, in a specific implementation, the optical module also has a thermal pad disposed between the bottom plate 34 and the inner wall of the housing 200. For example, in an optical communication system, the optical module has a main heat-dissipation housing and a secondary heat-dissipation housing (i.e. top surface and bottom surface specified in the multi-source protocol). In this embodiment, the upper housing 21 is the main heat-dissipation housing of the optical module, and the lower housing 22 is the secondary heat dissipation housing. When the optical module is inserted into the optical communication host, the upper housing 21 is adjacent to the heat dissipation mechanism of the optical cage of the optical communication host, which is the main area for heat dissipation between the optical module and the outer environment. The heat generated by the power-consuming chip in the optical device box when operating is directly transmitted to the main heat-dissipation housing of the housing through the bottom plate (heat-dissipation plate) of the optical device box. The heat is directly dissipated through the main heat-dissipation housing, so as to effectively improve the heat dissipation efficiency of the optical module.

Referring to FIG. 5 and FIG. 6, a certain gap 340 is formed between the bottom plate 34 and the upper housing 21. In specific implementation, a thermal pad 340 is provided in the gap between the bottom plate 34 and the upper housing 21. The thermal pad 340 is generally a thermal conductive adhesive layer.

The photoelectric chip described in this disclosure includes light-emitting chip(s) and light-receiving chip(s), and the optical processing unit includes a transmission end optical processing unit and a receiving end optical processing unit. Wherein the transmission end optical processing unit includes one or more combinations of collimating lens(es), wavelength division multiplexer(s), optical isolator(s) and coupling lens(es); the receiving end optical processing unit includes one or more combinations of collimating lens(es), wavelength division demultiplexer(s), coupling lens(es), and reflector(s).

The optical assembly includes a transmission end optical assembly and a receiving end optical assembly (neither shown in the figure). The transmission end optical assembly includes light-emitting chip(s) and a transmission end optical processing unit. The receiving end optical assembly includes light-receiving chip(s) and a receiving end optical processing unit.

In some embodiments, the optical device box 300 is provided with a partition 30 therein that isolates the transmission end optical assembly from the receiving end optical assembly. It can be understood that the optical device box 300 involved in this disclosure is formed with an accommodation cavity for accommodating optical assemblies. As shown in FIG. 4, in this specific embodiment, the receiving cavity includes a first accommodation cavity 31 and a second accommodation cavity 32 separated by the partition 30. The transmission end optical assembly is accommodated in the first accommodation cavity 31, and the receiving end optical assembly is accommodated in the second accommodation cavity 32. The first accommodation cavity 31 and the second accommodation cavity 32 are arranged in parallel in a direction perpendicular to the light transmission direction. In the meantime, the first accommodation cavity 31 and the second accommodation cavity 32 are both covered by the above-mentioned cover plate 35. In this embodiment, due to the separation function of the partition 30, mutual interference between the transmission end optical assembly and the receiving end optical assembly may be effectively avoided.

In other embodiments of present disclosure that are not shown, the positions of the transmission end optical assembly and the receiving end optical assembly may also be switched, that is, the transmission end optical assembly is disposed in the second accommodation cavity 32 and the receiving end optical assembly is disposed in the first accommodation cavity 31.

The optical module in this disclosure also has an optical fiber connector. As shown in FIG. 1 to FIG. 5, the optical fiber connector includes a transmission end optical receptacle 51 that is optically coupled to the transmission end optical assembly and a receiving end optical receptacle 52 that is optically coupled to the receiving end optical assembly.

In this disclosure, an insertion guide port 60 is formed on the movable head 600 to facilitate the connection of optical fibers and optical fiber connector. Based on the setting of the movable head 600, the assembly tolerance in the optical module assembly process may be absorbed to a certain extent. In this way, the tolerance for assembly tolerance is improved, and the difficulty of processing and assembling components is reduced.

It should be understood that although this specification is described in terms of implementations, it should not be construed that each implementation only contains an independent technical solution. The descriptions provided in the specification are for the purpose of clarity only. Persons skilled in the art should comprehend the specification as a whole, and the technical solutions in various embodiments may also be combined as appropriate to form other embodiments that can be understood by those skilled in the art.

The series of detailed descriptions listed above are only specific descriptions of feasible implementations of the present disclosure. They are not intended to limit the protection scope of the present disclosure. Any equivalent implementations or modifications that do not deviate from the technical spirit of the present disclosure should be included in the protection scope of this disclosure.

What is claimed is:

1. An optical module, comprising a housing, and an optical assembly and a circuit board which are disposed inside the housing, wherein the optical module further comprises an optical device box disposed inside the housing, wherein the optical assembly is packaged in the optical device box; the circuit board is provided with an extension portion extending to overlap the optical device box, the optical device box is fixed on one surface of the extension portion, wherein the extension portion is part of the circuit board, and is not a flexible circuit board; the optical device box is provided with an optical interface and an electrical interface, the optical assembly comprises a photoelectric chip and an optical processing unit, the photoelectric chip is electrically connected to the circuit board outside the optical device box through the electrical interface, the optical processing unit is optically connected to the outside of the optical device box through the optical interface, wherein the optical module comprises a conductive substrate, and the conductive substrate is provided on one side wall of the optical device box, wherein one end of the conductive substrate is electrically connected to the optical assembly in the optical device box, and the other end extends through the side wall to the outside of the optical device box to be electrically connected to the circuit board.

2. The optical module according to claim 1, wherein the housing comprises an upper housing, a lower housing and a movable head that cooperate with each other, wherein the upper housing and the lower housing are matched to form an internal accommodation cavity and an end portion space for accommodating the movable head; one end of the internal accommodation cavity is connected to the end portion space, and the other end has an opening; the circuit board and the optical device box are located in the internal accommodation cavity; the extension portion of the circuit board is adjacent to the end portion space, and one end of the circuit board away from the extension portion passes through the opening to be electrically connected to outside of the optical module.

3. The optical module according to claim 1, wherein the extension portion has a fixed surface face to the optical device box and an expanded surface away from the fixed surface; wherein the fixed surface is configured to support and fix the optical device box; a layout space of the circuit board comprises the expanded surface.

4. The optical module according to claim 1, wherein the electrical interface comprises a radio frequency (RF) signal connection port and a direct current (DC) signal connection port, the RF signal connection port is electrically connected to the circuit board, and configured to transmit a RF signal between the circuit board and the optical assembly inside the optical device box; the DC signal connection port is electrically connected to the circuit board, and configured to transmit a DC signal between the circuit board and the optical assembly inside the optical device box.

5. The optical module according to claim 4, wherein a portion of the conductive substrate located outside the optical device box has two surfaces opposite each other, and the RF signal connection port and the DC signal connection port are respectively disposed on the two surfaces.

6. The optical module according to claim 5, wherein the RF signal connection port is electrically connected to the circuit board through a RF signal flexible circuit board; the DC signal connection port is electrically connected to the circuit board through a DC signal flexible circuit board.

7. The optical module according to claim 6, wherein the optical assembly comprises a transmission end optical assembly and a receiving end optical assembly, the RF signal flexible circuit board comprises a first transmission portion and a second transmission portion, the first transmission portion is provided for the circuit board to transmit the RF signal toward the transmission end optical assembly, and the second transmission portion is provided for the receiving end optical assembly to transmit the RF signal toward the circuit board.

8. The optical module according to claim 7, wherein the first transmission portion and the second transmission portion are arranged in parallel; the RF signal flexible circuit board further has a ground trace provided between the first transmission portion and the second transmission portion, wherein the ground trace is provided to isolate the first transmission portion from the second transmission portion.

9. The optical module according to claim 6, wherein the RF signal flexible circuit board and the DC signal flexible circuit board are respectively and electrically connected to the RF signal connection port and the DC signal connection port on the two surfaces of the conductive substrate through an anisotropic conductive film or a solder anisotropic conductive paste.

10. The optical module according to claim 1, wherein the optical device box comprises a bottom plate, side walls arranged around the bottom plate, and a cover plate opposite to the bottom plate, wherein the side walls connect the bottom plate and the cover plate; the cover plate is adjacent to the extension portion of the circuit board, and the bottom plate is adjacent to an inner wall of the housing.

11. The optical module according to claim 10, wherein the optical device box is a hermetically sealed box.

12. The optical module according to claim 10, wherein the bottom plate is a heat-dissipation plate, the photoelectric chip is thermally connected to the heat-dissipation plate, and the heat-dissipation plate is thermally connected to the housing.

13. The optical module according to claim 10, wherein the photoelectric chip comprises a light-emitting chip and a light-receiving chip, the optical processing unit comprises a transmission end optical processing unit and a receiving end optical processing unit; the optical assembly comprises a transmission end optical assembly and a receiving end optical assembly, wherein the transmission end optical assembly comprises the light-emitting chip and the transmission end optical processing unit, and the receiving end optical assembly comprises the light-receiving chip and the receiving end optical processing unit; the optical device box is provided with a partition isolating the transmission end optical assembly from the receiving end optical assembly.

* * * * *